No. 798,560. PATENTED AUG. 29, 1905.
C. VON BECHTOLSHEIM.
APPARATUS FOR DISCHARGING AND STACKING HAY OR THE LIKE.
APPLICATION FILED APR. 28, 1903.

3 SHEETS—SHEET 1.

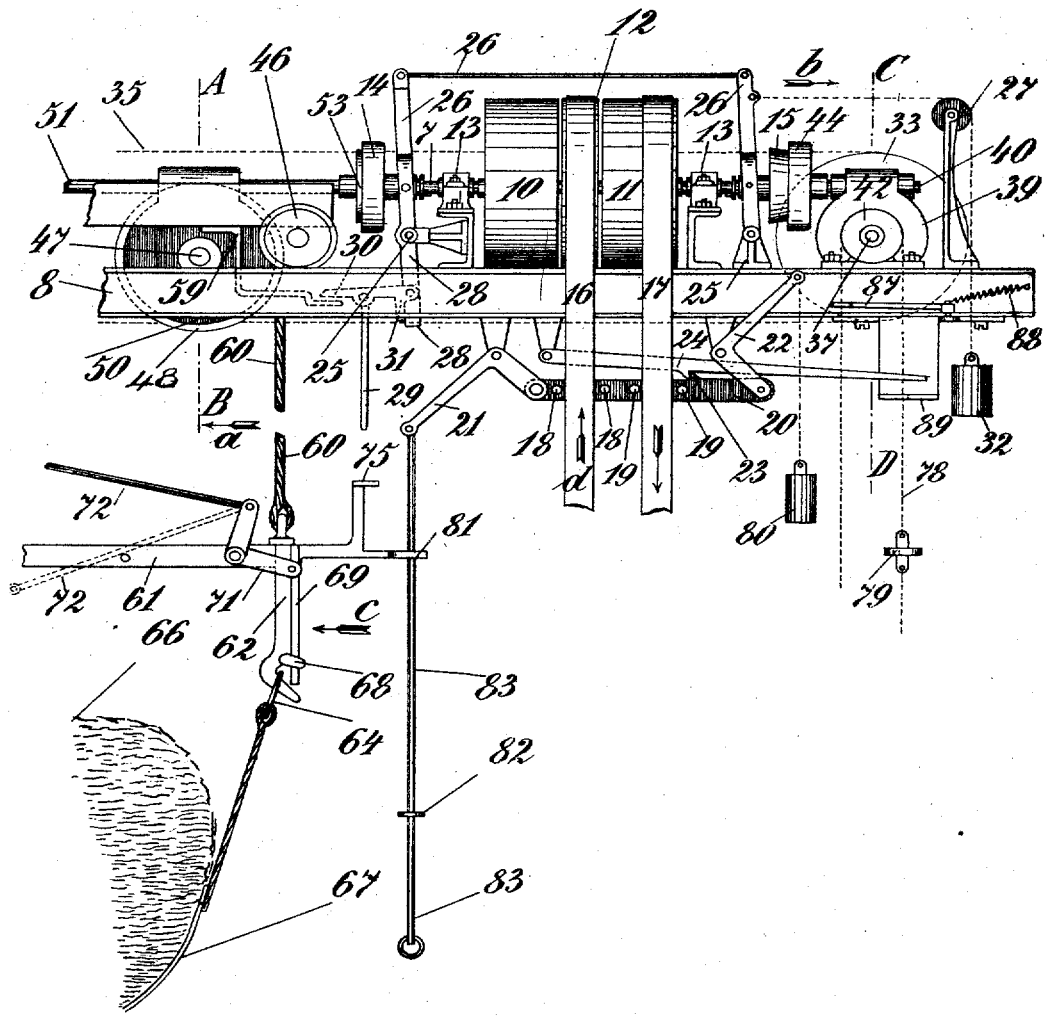

No. 798,560. PATENTED AUG. 29, 1905.
C. VON BECHTOLSHEIM.
APPARATUS FOR DISCHARGING AND STACKING HAY OR THE LIKE.
APPLICATION FILED APR. 28, 1903.
3 SHEETS—SHEET 3.
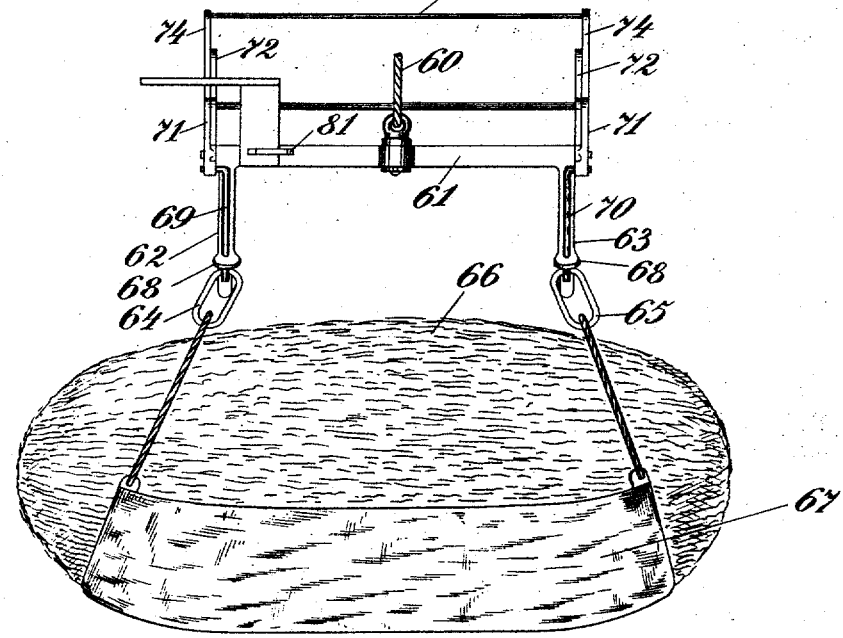
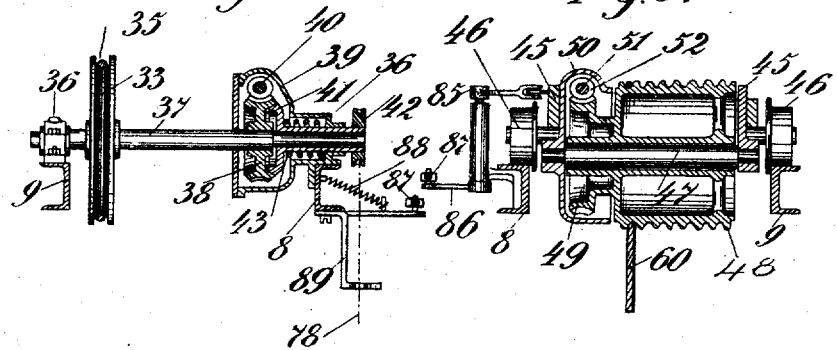

UNITED STATES PATENT OFFICE.

CLEMENS VON BECHTOLSHEIM, OF MUNICH, GERMANY.

APPARATUS FOR DISCHARGING AND STACKING HAY OR THE LIKE.

No. 798,560.      Specification of Letters Patent.      Patented Aug. 29, 1905.

Application filed April 28, 1903. Serial No. 154,610.

*To all whom it may concern:*

Be it known that I, CLEMENS VON BECHTOLSHEIM, a subject of the King of Bavaria, and a resident of Munich, Germany, have invented a certain new or Improved Apparatus for Discharging and Stacking Hay, Straw, or the Like, of which the following is a specification.

The present invention relates to a new or improved apparatus for discharging and stacking hay, straw, and the like.

The method employed essentially consists in conveying the hay or the like underneath an elevator and causing it to be lifted off the wagon by the said elevator and conveyed in a horizontal direction to the loft or the like where it is deposited.

The novelty consists in the fact that the whole of the operations described are automatic and that the cage or the like which conveys the discharged material automatically returns to its original position without requiring attention on the part of the attendant. The action of the discharging apparatus therefore comprises the following operations: First, the hoisting of the loaded basket or cage to the level of the conveyer-trolley; secondly, the removal of the basket in a horizontal direction to the spot where it is to be discharged; thirdly, the discharge of the hay or the like and return of the basket; fourthly, the descent of the basket to its original position. The first and second operations can, for example, be effected by the rotation of a driving-shaft in one direction and the third and further operations by the rotation of the said shaft in the opposite direction.

One form of the apparatus is shown in the annexed drawings, in which—

Figure 1:
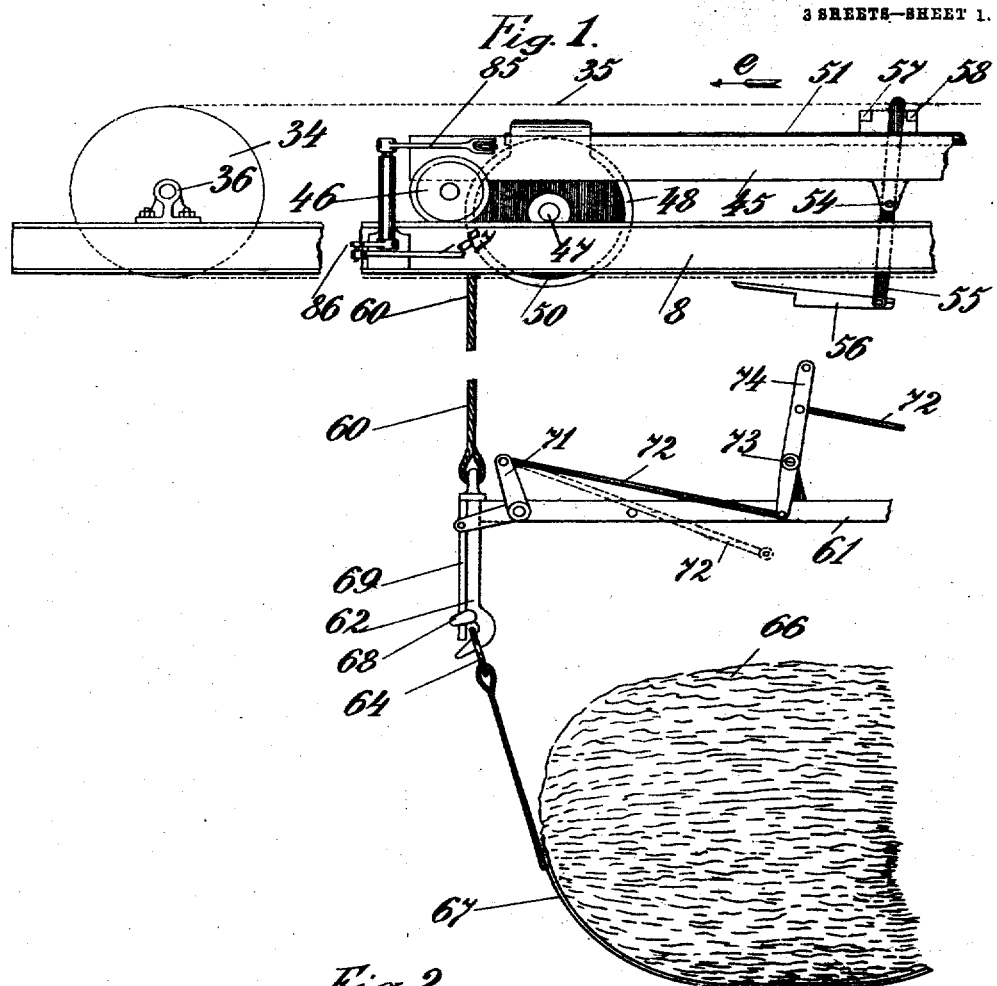
Figure 2:
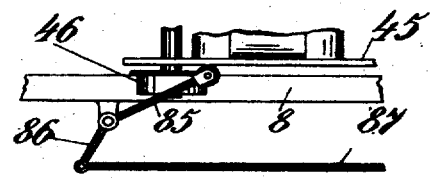
Figure 3:
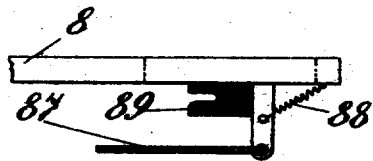

Figures 1 and 1ª show the entire apparatus in elevation. Figs. 2 and 3 are plan views of details of the apparatus. Fig. 4 is an end view of the basket seen from the direction of the arrow $c$ of Fig. 1ª. Fig. 5 is a cross-section on line A B of Fig. 1ª seen from the direction of the arrow $a$, and Fig. 6 is a cross-section on the line C D of Fig. 1ª seen from the direction of the arrow $b$.

The lift or elevator essentially comprises a basket, a trolley with a winch adapted to travel on supports 8 and 9, tackle for operating the said trolley, and means for driving the whole.

In Fig. 1ª the driving-gear is represented by a pulley 12, mounted with two loose pulleys 10 and 11 on a shaft 7, mounted in bearings 13. Since the direction of motion must be changed during the operation, two driving-belts 16 and 17 are provided. The belts, guides, or forks 18 and 19 are arranged on a bar 20, adapted to move longitudinally and pivoted to bell-crank levers 21 and 22. The said bar 20 is provided with an abutment 23, which is adapted to engage a similar abutment on a lever 24. The coupling-disks 14 and 15 are secured to shaft 7 by a spline connection, so as to be adjustable in a longitudinal direction. To one of the rocking levers 26 an arm 28 is connected, which has pivoted to it a pawl or finger 30, with an abutment 31 and a depending rod 29. The finger 30 is adapted to engage an arm 59, fixed to the trolley. The automatic movement of the rocking levers 26 in the direction of the arrow $b$ can be effected by means of a weight 32, attached to a cord running over pulley 27. The cord 35 for operating the trolley runs over pulleys 33 and 34, supported in bearings 36, fixed to the supports 8 and 9. Attached to shaft 37 of pulley 33 is a worm-wheel 38, which engages an endless screw on the shaft 40, inclosed in the casing 39, Fig. 6. The latter can be in one piece with the bearings. Mounted loosely on the shaft 37 is a friction-wheel 41, adapted to be rotated by friction by the worm-wheel 38. Fixed to the hub of the said friction-wheel 41 is a chain-wheel 42. The wheels 38 and 41 are pressed against each other—for example, by a spring 43, arranged in the casing. Upon shaft 40 the friction-disk 44 is mounted and can be coupled with the shiftable friction-disk 15. The trolley consists, for instance, of a frame 45 and wheels 46. In said frame are two axles 47, carrying pulleys 48, to each of which a worm-wheel 49 is fixed, Fig. 5. A shaft 51 has bearing in two cases 50, which inclose the worm-wheels 49, and the latter are driven by worms 52 on the said shaft, of which one is provided with a right thread the other with a left-hand thread. The coupling-disk 53 is securely mounted upon the end of shaft 51 and can be coupled with the friction-disk 14 by shifting the latter upon shaft 7 in the direction of the disk 53. Pivoted to the frame of the trolley at 54 is a lever 55, with a catch 56 pivoted to its lower end and with its upper end situated between two stops 57 and 58, fixed to the frame. The cord 35 is attached to this lever 55. The basket is suspended by means of cords 60 and consists of a frame 61 and 62 63, provided with hooks or the like for the rings 64 and 65, to which the cloth 67 is attached. The said rings are held in the hooks by slide-bars 69 and 70, adapted to move in guides 68 and pivoted to angle-levers 71, which are connected by rods 72 to a system of rocking levers 74, pivoted at 73 to the frame 61.

The action of this form of the apparatus is as follows: The cloth 67 is spread on the hay-wagon before the latter is loaded, and when the wagon has been driven underneath the elevator the rings 64 and 65 are placed on the hooks of the trolley-frame. To elevate the cloth with the hay, the parts must have the position shown in Fig. 1ª—that is to say, the belt 17 must be on a loose pulley and the belt 16 on the fast pulley, so as to move in the direction of the arrow $d$ and drive the shaft 7 with the coupling-disks 14 and 15. Since the disk 14 is coupled with the disk 53, the shaft 51 is also driven by this means, and therefore both the pulleys 48 revolve and the basket will be lifted. When the basket has reached its highest position, its arm 75 abuts against the rod 29 and lifts the finger 30 out of engagement with the arm 59. The rocking levers 26 are thus disengaged and rock to the right together with the coupling-disks 14 and 15, so that the disk 14 is disconnected from the disk 53 and the disks 15 and 44 brought into engagement with each other. At the same time the levers 74 abut against the catch 56 and lift the latter. The engagement of the disks 15 and 44 causes the worm-gear (shown in Fig. 6) to be put in motion, and the cord 35 will be moved in the direction of the arrow $e$, so that the lever 55 is rocked to the left until its upper end abuts against the stop 57 and the catch 56 engages the upper lever 74. The movement of the cord 35 thereupon causes the trolley to be moved in the direction of the arrow $e$. The movement of the worm-gear also causes the chain-wheel 42 to revolve, and the chain 78, running over the latter, is thus also moved until the abutment 79, attached to it, comes into contact with the arm 24 and lifts the latter. At this moment the abutment 23 will be disengaged, so that the weight 80, connected to the lever 22, can descend by gravity and shift the belt-forks, with the belts 16 and 17, to the left, so that the belt 16 is shifted onto the loose pulley 10 and the belt 17 onto the fast pulley 12. The direction of travel of the belt 17 is the opposite to that of the belt 16, so that the direction of travel of the cord 35 is reversed. During its return the said cord moves the lever 55 back into the position shown in Fig. 1, so that the catch is moved to the left and with it the levers 74.

The angle-levers 71 and the slides 69 and 70 are so operated that the rings 64 or 65 are released and the pack 66 can fall or roll down. As soon as the lever 55 comes into contact with the stop 58 the trolley is caused by the cord 35 to move back to the position shown in Fig. 1. When it has reached that position, the arm 59 abuts against the finger 30 and causes the levers 26 to rock into the position shown in Fig. 1ª, so that the coupling-plates 15 and 44 are disconnected from each other. The disk 14 can be fixed to the shaft, since the disk 53 is moved backward and forward with the trolley. The belt 17 runs in fixed pulley 12, so that the pulleys 48 are so operated by the shaft 51 that they cause the basket to descend. When the basket has reached its lowest position, its arm 81 abuts against the stop 82 on the rod 83 and causes the bar 20 to swing to the right until the two belts 16 and 17 are on the loose pulleys 10 and 11 without touching the fast pulley 12 between the latter. At this moment the elevator stops and can be recharged. When this has been done, the rod 83 is pulled so as to move the bar 20 farther to the right to cause the abutment 23 to engage the lever 24. By this movement the belt 16 is again shifted to the fast pulley and the action of the elevator is repeated. To allow of discharging the hay at the side, either on the left or on the right, and therefore to horizontally spread the hay, the basket can be opened at one side only, so that the hay falls out on that side. For this purpose the rods on one side are disconnected from the levers 74 and, if necessary, moved into the position shown in Fig. 1 in dotted lines, so that only the slides 69 or 70 on one side are operated and release the rings on that side. To allow of altering the position in which the material is discharged, the chain-wheel 42 is, as already stated, only driven by friction, so that the position of the chain with the abutment 79 can be adjusted at will. To prevent the accidental lifting of the lever by the abutment 79 before the basket has left the point of loading, a bell-crank lever can, for instance, be arranged on the support 8, as shown in Figs. 1, 1ª, 2, 3, and 5, so that its one arm 85 bears against the trolley and its other arm 86 is connected by a rod 87 with a slide 89, adapted to move on the support 8 and engaging the lever 24. A spring 88 tends to move the slide to the right. If the chain 78 is accidentally or unintentionally displaced, so that the abutment 79 would operate the lever 24 too soon, it is prevented from doing so by the slide 89. (See Fig. 1ª.) When the trolley has left its point of loading, the arm 85 is released and the slide is moved to the right by the spring 88, so that the abutment 79 can take effect. It is obvious that instead of the weights springs can be used and instead of pulleys toothed or friction wheels or electrical motive power without affecting the principle of the invention. The basket and the means for releasing the load can be modified and adapted to special requirements without necessitating any change in the action of the apparatus. Instead of removing the hay in batches by means of a cloth it can be picked up by means of grippers in the known manner.

Having thus described my invention, the following is what I claim as new therein and desire to secure by Letters Patent:

1. Device for automatically unloading and stacking hay, straw and other materials consisting in the combination of a movable drum, a stationary operating device for said drum and a stationary reversible main driving mechanism alternately to be coupled with the movable drum and the operating device, which main driving mechanism is provided with mechanisms in such way that the hoisting may be effected by coupling the drum with the main driving mechanism, the moving forward of the drum toward the discharge place by automatically coupling the operating devices with the main driving mechanism, the return of the drum by automatically reversing said main driving mechanism, the stopping and unwinding of the drum by automatically uncoupling the operating devices and simultaneously coupling of the drum with the main driving mechanism, and finally also the stopping of the drum by the automatic disengagement of the main driving mechanism.

2. In apparatus for unloading and automatically stacking hay, straw and the like, the combination of a basket for containing the hay, a trolley adapted to convey said basket in a horizontal direction, mechanism on the trolley for raising and lowering said basket said mechanism being disengaged by its own action in its uppermost position, mechanism for horizontally driving the trolley adapted to be put into engagement by the basket-hoisting mechanism on disengagement of the latter and mechanisms for the reverse motion in which the disk engagement of the mechanisms for the horizontal motion and the coupling of the downward movement is effected by the returning running-gear, and means operated by the trolley for releasing the basket to discharge its contents, substantially as described.

3. In apparatus for unloading and automatically stacking hay, straw and the like, the combination of a basket for containing the hay, a trolley connected to and adapted to convey said basket in a horizontal direction, mechanism on said trolley for hoisting said basket, said mechanism being disengaged by its own action in its uppermost position, mechanism for horizontally driving the trolley, means for coupling and uncoupling said driving mechanism adapted to be put into gear by a weight and out of gear by the movement of the trolley, whereupon the aforesaid hoisting mechanism is put into gear until the basket acts again on the weight to cause the latter to bring the driving mechanism into gear again, and means for discharging the contents of the basket, substantially as described.

4. In apparatus for unloading and automatically stacking hay, straw and the like, the combination of a basket for containing the hay, a trolley adapted to convey said basket in a horizontal direction, mechanism on the trolley for hoisting said basket, said mechanism being disengaged by its own action in its uppermost position, mechanism for horizontally driving the trolley adapted to be put into engagement by the basket-hoisting mechanism on disengagement of the latter and mechanisms for the reverse motion in which the disk engagement of the mechanisms for the horizontal motion and the coupling of the downward movement is effected by the returning running-gear, means operated by the trolley for releasing the basket to discharge its contents, and adjustable means for controlling the direction of rotation of the aforesaid hoisting and driving mechanism, substantially as described.

5. In apparatus for unloading and automatically stacking hay, straw and the like, the combination of a basket for containing the hay, a trolley adapted to convey said basket in a horizontal direction, mechanism on the trolley for hoisting said basket, said mechanism being disengaged by its own action in its uppermost position, mechanism for horizontally driving the trolley adapted to be put into engagement by the basket-hoisting mechanism on disengagement of the latter and mechanisms for the reverse motion in which the disk engagement of the mechanisms for the horizontal motion and the coupling of the downward movement is effected by the returning running-gear, adjustable means for controlling the direction of rotation of the hoisting and driving mechanism, means operated by the trolley for releasing the basket to discharge its contents, and means for varying the point of discharge, substantially as described.

6. In apparatus for unloading and automatically stacking hay, straw and the like, the combination of a basket for containing the hay, a trolley adapted to convey said basket in a horizontal direction, mechanism on the trolley for hoisting said basket, said mechanism being disengaged by its own action in its uppermost position, mechanism for horizontally driving the trolley adapted to be put into engagement by the basket-hoisting mechanism on disengagement of the latter and mechanisms for the reverse motion in which the disk engagement of the mechanisms for the horizontal motion and the coupling of the downward movement is effected by the returning running-gear, adjustable means for controlling the direction of rotation of the hoisting and driving mechanism, means operated by the trolley for releasing the basket to discharge its contents, means for varying the point of discharge, and means for preventing the premature discharge, substantially as described.

The foregoing specification signed this 11th day of April, 1903.

CLEMENS VON BECHTOLSHEIM.

In presence of—
EMIL FRITZ,
ELLWOOD WILSON.

---

It is hereby certified that in Letters Patent No. 798,560, granted August 29, 1905, upon the application of Clemens von Bechtolsheim, of Munich, Germany, the title of the invention was erroneously written and printed "Apparatus for Discharging and Stacking Hay or the Like," whereas the said title should have been written and printed *Apparatus for Discharging and Stacking Hay, Straw, or the Like;* and that the said Letters Patent should be read with this correction therein that the same may conform to the record of the case in the Patent Office.

Signed and sealed this 12th day of September, A. D., 1905.

[SEAL.]

F. I. ALLEN,
*Commissioner of Patents.* zontal motion and the coupling of the downward movement is effected by the returning running-gear, adjustable means for controlling the direction of rotation of the hoisting
5 and driving mechanism, means operated by the trolley for releasing the basket to discharge its contents, means for varying the point of discharge, and means for preventing the premature discharge, substantially as described.

The foregoing specification signed this 11th day of April, 1903.

CLEMENS VON BECHTOLSHEIM.

In presence of—
EMIL FRITZ,
ELLWOOD WILSON.

---

Correction in Letters Patent No. 798,560.

It is hereby certified that in Letters Patent No. 798,560, granted August 29, 1905, upon the application of Clemens von Bechtolsheim, of Munich, Germany, the title of the invention was erroneously written and printed "Apparatus for Discharging and Stacking Hay or the Like," whereas the said title should have been written and printed *Apparatus for Discharging and Stacking Hay, Straw, or the Like;* and that the said Letters Patent should be read with this correction therein that the same may conform to the record of the case in the Patent Office.

Signed and sealed this 12th day of September, A. D., 1905.

[SEAL.]

F. I. ALLEN,
*Commissioner of Patents.*

Correction in Letters Patent No. 798,560.

It is hereby certified that in Letters Patent No. 798,560, granted August 29, 1905, upon the application of Clemens von Bechtolsheim, of Munich, Germany, the title of the invention was erroneously written and printed "Apparatus for Discharging and Stacking Hay or the Like," whereas the said title should have been written and printed *Apparatus for Discharging and Stacking Hay, Straw, or the Like;* and that the said Letters Patent should be read with this correction therein that the same may conform to the record of the case in the Patent Office.

Signed and sealed this 12th day of September, A. D., 1905.

[SEAL.]

F. I. ALLEN,
*Commissioner of Patents.*